United States Patent [19]

Bayerlein et al.

[11] Patent Number: 6,153,098
[45] Date of Patent: *Nov. 28, 2000

[54] SPIRAL WOUND FILTER WITH CENTRAL BARRIER

[75] Inventors: Richard E. Bayerlein, Elm Grove; Douglas G. Bayerlein, Waukesha, both of Wis.

[73] Assignee: Filtration Systems, Inc., Waukesha, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/922,404

[22] Filed: Sep. 3, 1997

[51] Int. Cl.[7] .......................... B01D 29/07; B01D 29/11; B01D 29/48; B01D 29/50

[52] U.S. Cl. .................................. 210/497.1; 210/321.74; 210/321.76; 210/321.83; 210/321.85; 210/493.4; 55/498

[58] Field of Search .......................... 210/321.74, 321.76, 210/321.83, 321.85, 493.4, 497.1; 55/498, 520

[56] References Cited

U.S. PATENT DOCUMENTS

| | | |
|---|---|---|
| 1,606,647 | 11/1926 | McCutcheon . |
| 1,742,743 | 1/1930 | Worbois . |
| 1,805,903 | 5/1931 | Bull . |
| 1,861,576 | 6/1932 | Liddell . |
| 1,951,484 | 3/1934 | Lawes . |
| 2,427,733 | 9/1947 | McCann . |
| 2,478,109 | 8/1949 | Kamrath . |
| 2,647,637 | 8/1953 | Leet . |
| 2,798,614 | 7/1957 | Alexander . |
| 2,850,168 | 9/1958 | Nostrand . |
| 3,016,345 | 1/1962 | Price . |
| 3,020,977 | 2/1962 | Huppke . |
| 3,042,216 | 7/1962 | Goldman . |
| 3,063,888 | 11/1962 | Howard et al. . |
| 3,095,370 | 6/1963 | Krogman . |
| 3,102,014 | 8/1963 | Aitkenhead . |
| 3,140,968 | 7/1964 | Barrios et al. . |
| 3,323,963 | 6/1967 | Summers . |
| 3,356,227 | 12/1967 | Rule et al. . |

(List continued on next page.)

FOREIGN PATENT DOCUMENTS

| | | |
|---|---|---|
| 2028664 | 12/1971 | Germany . |
| 699168 | 10/1953 | United Kingdom . |
| 2047107 | 11/1980 | United Kingdom . |

OTHER PUBLICATIONS

AMT: *Industrial Membrane Separation Process Technology.*
AMT: *Membrane Configurations.*
MSI: *Filter Membrane Selection Chart*, Micron Separations, Inc.

Primary Examiner—W. L. Walker
Assistant Examiner—Michael Fleming
Attorney, Agent, or Firm—Michael Best & Friedrich LLP

[57] ABSTRACT

The present invention comprises a fluid filter element which has a hollow perforate cylindrical supporting core. A relatively fine filter media of substantial cross section is spirally wound about the supporting core with adjacent layers spaced from each other and with the fine filter media accommodating fluid flow for filtering in both a radial and circumferential direction through the cross section and with free access through the cross section to the supporting core. In substantially the same manner, a relatively coarse filter media of substantial cross section is disposed in the space between the layers of fine filter media and with the coarse filter media exiting at the supporting core, the coarse filter media accommodating fluid flow for filtering in both a radial and circumferential direction through the cross section and with free access through the cross section to the supporting core. A central barrier is disposed adjacent the supporting core and at least one of the layers of filter media in approximately the center of the filter element to assist in the filtration process.

18 Claims, 7 Drawing Sheets

U.S. PATENT DOCUMENTS

| | | |
|---|---|---|
| 3,384,241 | 5/1968 | Nostrand . |
| 3,415,384 | 12/1968 | Kasten . |
| 3,443,366 | 5/1969 | Schwab . |
| 3,468,425 | 9/1969 | Engstrom . |
| 3,827,562 | 8/1974 | Esmond . |
| 4,032,688 | 6/1977 | Pall . |
| 4,083,780 | 4/1978 | Call . |
| 4,187,136 | 2/1980 | Nostrand . |
| 4,233,042 | 11/1980 | Tao . |
| 4,241,787 | 12/1980 | Price . |
| 4,296,810 | 10/1981 | Price . |
| 4,411,791 | 10/1983 | Ward . |
| 4,425,239 | 1/1984 | Jacocks et al. . |
| 4,502,955 | 3/1985 | Schaupp . |
| 4,502,956 | 3/1985 | Wilson et al. . |
| 4,604,205 | 8/1986 | Ayers . |
| 4,877,527 | 10/1989 | Brownell . |
| 4,938,869 | 7/1990 | Bayerlein et al. . |
| 5,538,642 | 7/1996 | Solie . |

SPIRAL WOUND FILTER WITH CENTRAL BARRIER

BACKGROUND OF THE INVENTION

The present invention relates generally to an improved apparatus and method for filtering fluids that is particularly useful for filtering lubrication oil or other fluids for internal combustion engines.

One of the more common methods of cleaning fluids is filtration. Such filtration involves separating insoluble particulate matter from the fluid by passing the fluid through a filter medium which traps and retains the particulates. Fluid filters essentially act as a strainer to remove contaminants from both liquids and gases. Contaminants include particulates and deposits that can naturally form in some fluids and negatively affect system operation, life or reliability. Therefore, effectively cleaning such fluids is desirable.

Fluid filters typically incorporate a disposable circular cylindrical filter element (or cartridge) which has a perforate central supporting core contained within a casing. The filter element is usually assembled by wrapping multiple layers of filter media around the central supporting core. The filter element is then traditionally mounted within the casing having an inlet for the unfiltered fluids, or influents. Typically, the influent enters the casing under pressure and then flows radially through the multiple layers of filter media. The filter media catches and retains contaminants as the fluid passes through the filter element. After the fluid completes flowing through the radial filtration path, the filtered fluid is drawn off from one end of the supporting core and reused. Similar filters for fuel, gas, air and other fluids are well known.

Such known filtering apparatus have incorporated filter elements consisting of concentric layers of filter media. Typically, an outer layer of filter media is formed of a relatively coarse filter media such as a wood excelsior. Coarse filter media has larger pore sizes and is designed to trap and retain larger contaminants. An inner layer is usually formed of a relatively fine filter media such as a cotton fiber batt. The fine filter media of the inner layer has smaller pore sizes and filters out the smaller contaminants as the fluid travels toward the central supporting core. Examples of such filter elements are described in U.S. Pat. No. 3,384,241 and 4,187,136 issued to William G. Nostrand.

The filter elements described in the United States Patents cited above tend to plug prematurely due to a buildup of contaminants towards the outer surfaces of either the coarse layer or the fine layer of filter media. The inner filter media often does not get used because the fluid cannot reach those layers. As a result of this buildup, much of the filtering capacity represented by the full thickness of the filter media cannot be utilized before the used filter element must be disposed of and replaced with a new filter element.

A filter element which operates more efficiently than prior filter elements comprising concentric filtering layers is shown and described in U.S. Pat No. 4,938,869, which is owned by the assignee of the present invention. This improved filter element comprises relatively long lengths of different filter media wound about the supporting core to form spiral convolute layers. This filter element prevents premature plugging by directing the influent through the filter element along both radial and circumferential flow paths that expose all portions of the filter media to the fluid. Like previous filters, the filter media can include wood excelsior and a batt of cotton material, although other filter media can also work well. If one area of the filter element becomes plugged, the filter element simply directs the fluid flow along an alternative path where clean, effective filter media is available. This improved filter element eliminates premature plugging and the need to replace the filter element until all the filter media of the filter element is plugged with contaminates from the filtered fluid.

The single disadvantage associated with the filter element configured spirally as described above is that, if the filter element is not replaced at the time the filter media comprising the filter element reaches capacity or is plugged, the unfiltered fluid is directed circumferentially between the layers until the fluid reaches the perforate central supporting core. On reaching the perforate central supporting core, the unfiltered fluid exits the filter assembly and is collected as effluent. In such cases, in addition to not being properly filtered, the unfiltered fluid is often combined with and contaminates filtered fluid.

SUMMARY OF THE INVENTION

In accordance with the present invention, a fluid filter element includes a hollow perforate, generally cylindrical supporting core, a layered assembly of filter media spirally wound about the supporting core, boundaries above and below the layered assembly of filter media restricting fluid flow to effective filtering portions of the filter element and a central barrier disposed adjacent the supporting core and a lead edge of the filter media proximate the supporting core. The filtration process of unfiltered fluid initiates when the influent is forced into a casing under pressure and surrounds the perimeter of the fluid element. The influent then flows through the layered assembly of filter media to the central supporting core. The effluent, or filtered fluid, is collected as it exits the supporting core through an outlet provided in the casing.

In accordance with one preferred embodiment of the present invention, the layered assembly filter media is provided by two layers, preferably blankets or sheets, of porous filter media. The two layers preferably comprise at least one coarse and one fine layer of filter media, laid together and spirally wound about the cylindrical supporting core. The unfiltered fluid initially flows along a radial path through layers of both blankets of filter media towards the perforate supporting core until a portion of one of the filter media becomes plugged. At the plugged portion of the filter element, the fluid flows circumferentially through the adjacent layer of filter media until the fluid reaches the end of the plugged area, at which time the fluid resumes flowing in a substantially radially direction onward through the filter element to the supporting core. The filtration path of the present invention, because it accommodates circumferential flow in addition to radial flow, can filter larger fluid volumes effectively.

The present invention solves the problem of unfiltered fluid circumventing the filtration system by flowing circumferentially throughout the length of the plugged filter element to the perforate central supporting core by placing a specially configured central barrier adjacent the supporting core. The central barrier of the present invention is preferably disposed in the spirally configured filter element adjacent to and between the supporting core and a layer of filter media. Placing the central barrier in this position prevents fluid from entering the supporting core without having passed through at least one layer of filter media.

It is therefore an object of the present invention to provide an improved method and apparatus for filtering oil and other fluids.

It is another object of the present invention to provide an improved fluid filter method and apparatus which uses the full capacity of the filter media.

It is yet another object of the present invention to provide a novel fluid filter method and apparatus which yields a longer useful operating life than prior filtration methods and apparatus.

It is yet another object of the present invention to provide an improved filtration method and apparatus which prevents unfiltered fluid from passing through and exiting the filter element.

It is a still further object of the present invention to provide a novel filtration method and apparatus which filters larger volumes of fluid without plugging.

It is another object of the present invention to provide an improved filtration method and apparatus which requires less maintenance.

It is a still further object of the present invention to decrease the cost of filtering oils and other fluids.

Other advantages and features of the invention, together with the organization and manner of operation thereof, will become apparent from the following detailed description when taken in conjunction with the accompanying drawings, wherein like elements have like numerals throughout the drawings.

BRIEF DESCRIPTION OF THE DRAWINGS

The features of the present invention that are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DETAILED DESCRIPTION OF THE PREFERRED EMBODIMENTS

Figure 1:
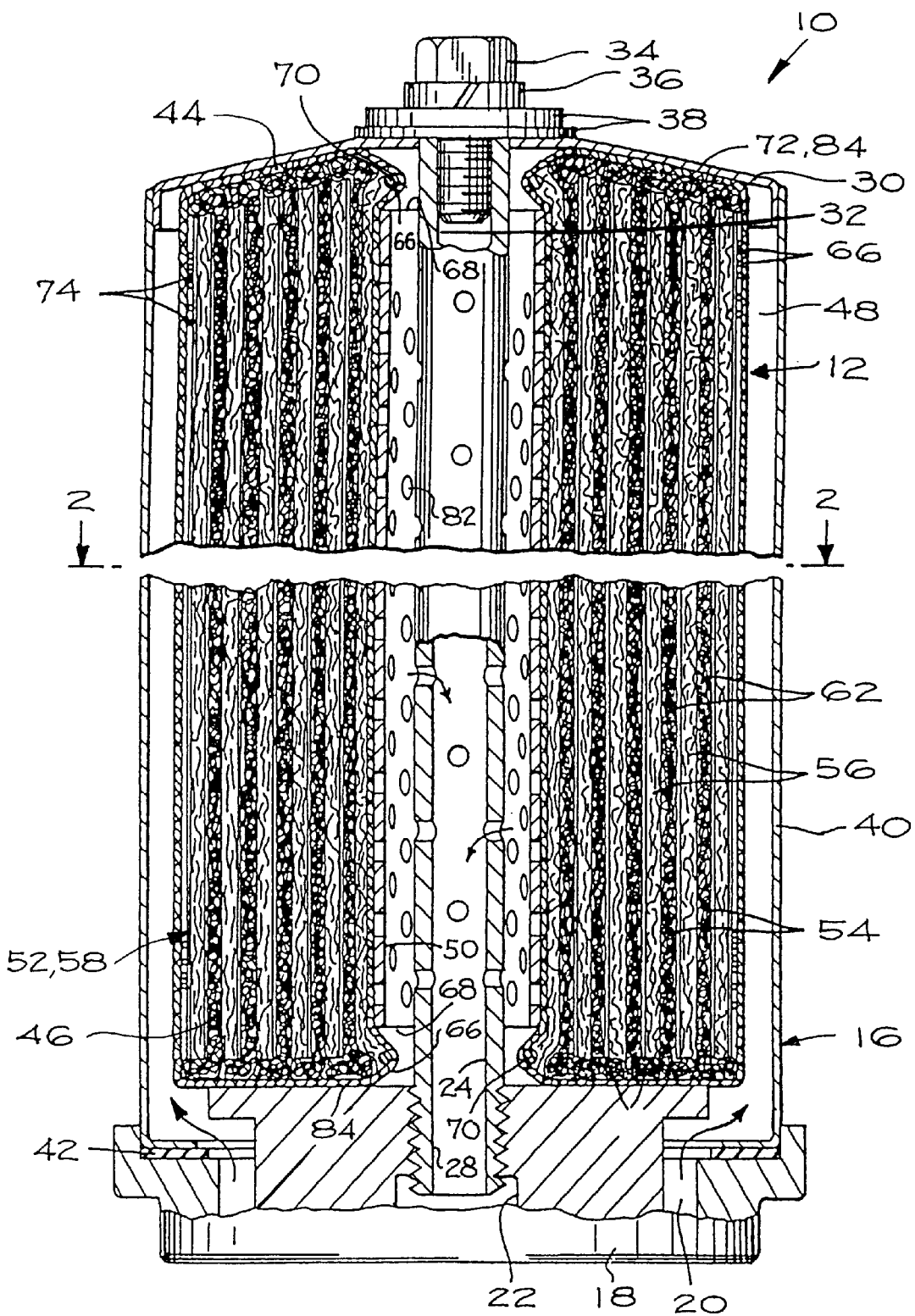
FIG. 1 is a view in longitudinal section of a filter element in accordance with the invention shown mounted in a casing.

Referring to the figures and more particularly to FIG. 1, a filter assembly constructed in accordance with one preferred embodiment of the present invention is illustrated at 10. While the filter assembly 10 of the present invention is described herein for filtering engine lubricating oil, the filter assembly 10 can effectively filter other fluids, such as air and water, as well. The filter assembly 10 of the present invention preferably comprises a filter element 12 having a central barrier 14 (shown in FIG. 7) mounted within a casing 16.

The filter assembly 10 disclosed and described herein may be used with many different forms of casings 16, and the casing 16 as depicted in FIG. 1 illustrates only one preferred embodiment of the present invention. The casing 16 is designed to retain the filter element 12 and preferably facilitates circulation of the unfiltered fluid through the filter element 12.

The casing 16 preferably includes a mounting assembly 18 accommodating an annular inlet 20 to permit influent to enter the filter assembly 10 and surround the filter element 12. The mounting assembly 18 further preferably comprises a concentric outlet 22 located substantially at the center of the mounting assembly 18 which allows effluent to exit from the filter assembly 10 after undergoing filtration. In preferred embodiments of the present invention, a central support tube 24 is coupled to the mounting assembly 18 at approximately the location of the outlet 22. One available method of coupling the support tube 24 to the mounting assembly 18 is by threading the support tube 24. Preferably, the support tube 24 is threaded at a lower end 28 so that the threads of the support tube 24 correspond to complementary threads in the mounting assembly 18.

The support tube 24 extends from the mounting assembly 18 through approximately the center of the casing 16 to an end cap 30 which forms the top of the casing 16. In preferred embodiments of the present invention, the end cap 30 is domed. An upper end 32 of the support tube 24 preferably fits within a complementary aperture located approximately at the center of the end cap 30. While numerous alternatives are available, preferred embodiments of the filter assembly 10 comprise a bolt 34 threaded into the upper end 32 of the support tube 24 to hold a gasket 36 and washers 38 above the end cap 30.

The end cap 30 is preferably coupled to a thin walled substantially cylindrical housing 40 of the casing 16. The housing 40 directs the influent though the filter element 12. While alternative methods exist for coupling the housing 40 to the end cap 30, brazing and welding are generally preferred. The end cap 30 is alternatively formed integrally with the housing 40 by deep drawing, although alternative formations are available and some function equally well. In embodiments of the present invention wherein the support tube 24 is coupled to the end cap 30 with the bolt 34, that same bolt 34 preferably forces the housing 40 to engage a gasket 42 in the mounting assembly 18.

The filter element 12 sits within the casing 16 and is preferably concentric with the support tube 24 and the housing 40 of the casing 16. A top 44 of the filter element 12 is preferably closed by the end cap 30 and a bottom 46 of the filter element 12 by the mounting assembly 18. As is shown in FIG. 1, an annular space 48 surrounding the perimeter of the filter element 12 inside the housing 40 of the casing 16 allows influent entering through the inlet 20 to freely circulate about the perimeter of the filter element 12.

The filter element 12 preferably has a hollow, perforate, metal inner supporting core 50 that surrounds, but is slightly spaced from the central support tube 24 of the casing 16. This preferred orientation is shown in FIG. 1. The supporting core 50 functions as an internal duct and further provides support for filter media 52. The outlet 22 in the mounting assembly 18 preferably coincides with the hollow central supporting core 50 of the filter element 12. The arrangement of the supporting core 50, the support tube 24 and the outlet 22 is best demonstrated in FIG. 1.

Figure 2:
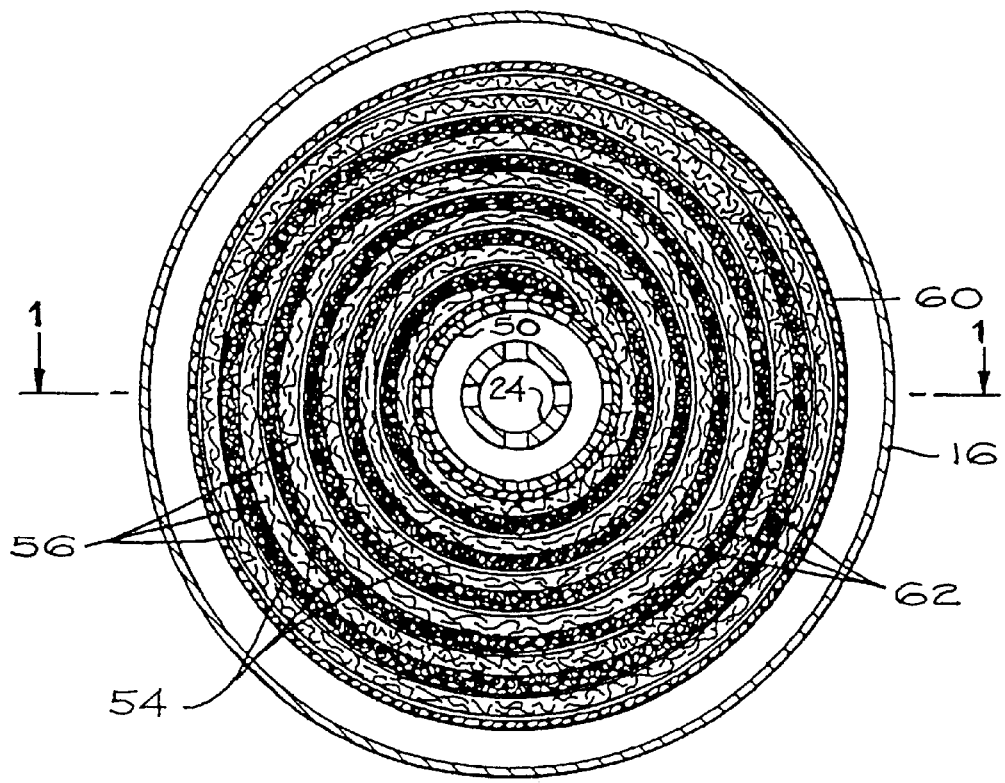
FIG. 2 is a sectional view of the filter element of FIG. 1.

The supporting core 50 of the present invention is enveloped within a layered assembly 58 of filter media 52 wound spirally onto the supporting core 50 in a series of convolute layers 60. The convolute layers 60 of the present invention are best shown in FIG. 2, and FIG. 1 shows a sectional view of the convolute layers 60 wound about the supporting core 50.

The layered assembly preferably comprises a carrier sheet 62 and filter media 52. Preferably the filter media 52 comprises material having at least two different pore sizes. A pore is an opening in filter medium which allows the passage of fluid, but traps contaminants that will not fit through the pores. Those of ordinary skill in the art will recognize that using a single filter medium will also work, though less effectively than using filter media 52 of different pore sizes.

In preferred embodiments of the present invention, the layered assembly 58 comprises filter media 52 of different filtering abilities. For example, in those preferred embodiments one layer 60 of fine filter media 54 and one layer 60 of coarse filter media 56 are superimposed together. The porosity of the filter media 52 widely varies depending on the desired end use. For filtering lubricating oils, the fine filter media 54 typically has a nominal rating of from 1 to 10 microns, while the coarse filter media 56 typically has a nominal rating of between 40 and 50 microns. One preferred embodiment uses a batt of cotton waste as fine filter media 54 and wood excelsior as a coarse filter media 56. While a variety of materials exist which are useable as filter media 52 in the present invention, non-woven materials are generally preferred. The filter media 52 can comprise blankets 74 (shown in FIGS. 12A and 13A), sheets or other structure of non-woven synthetic or natural fibers including paper.

Some arrangements of the layered assembly 58 including the carrier sheet 62 and filter media 52 are preferable to others. The carrier sheet 62 is preferably constructed of a non-woven synthetic material such as rayon or polyester fibers. The carrier sheet 62 serves to maintain the integrity of the layered assembly 58 both during construction and operation. The carrier sheet 62 acts primarily to hold the layered assembly 58 together, so the carrier sheet 62 is preferably both longer and wider than either the fine filter media 54 or the coarse filter media 56. The relative size of the carrier sheet 62 with respect to the fine filter media 54 and the coarse filter media 56 is illustrated in FIGS. 12A, 12B, 13A and 13B.

In the most preferred embodiments of the present invention, the supporting core 50 of the filter element 12 is located adjacent to the coarse filter media 56 as opposed to the fine filter media 54. This configuration is beneficial because the coarse filter media 56 acts as a pressure release zone to allow any fluid that has traversed through the filter element 12 to that point to flow through perforations 82 in the supporting core 50 relatively unimpeded. Alternative embodiments of the present invention provide a separate layer 60 of highly porous material for the same purpose around the perimeter of the supporting core 50.

The outer perimeter of the filter element 12 is also preferably encircled by the coarse filter media 56. That outermost convolute layer 60 of coarse filter media 56 preliminarily screens larger contaminates and also permits the fluid to flow better to all areas about the perimeter of the filter element 12. As an alternative, a separate layer 60 of another highly porous material can be used to surround the perimeter of the filter element 12 instead of extending the coarse filter media 56.

Because most preferred embodiments of the present invention have the coarse filter media 56 both adjacent the supporting core 50 and at the perimeter of the layered assembly 58, the blanket 74 or alternative structure of the coarse filter media 56 is preferably constructed longer than the corresponding blanket 74 of the fine filter media 54. This preferred configuration is best shown in FIG. 2 which illustrates a transverse section of the filter element 12 wherein the innermost and outermost of the convolute layers 60 comprise the coarse filter media 56. In constructing the layered assembly 58, placing the shorter blanket 74 of the fine filter media 54 at approximately the midpoint of the blanket 74 of coarse filter media 56 arranges the layered assembly 58 substantially as described herein. One construction of the layered assembly 58, together with a corresponding side view, as described above is illustrated in FIGS. 12A and 12B.

Although layered assemblies 58 of only two different filter media 52 are shown in the illustrated embodiments, more than two types of filter media 52 are also employable. Thus, for example, the blankets 74 of fine, medium and coarse filter media could be laid upon one other and spirally wound about the hollow supporting core 50 with the carrier sheet 62 to create the layered assembly 58 of the present invention.

In all embodiments, both those illustrated and those described generally herein, the filter element 12 works best when the fluid flow path 64 is relatively long. The longer path 64 is provided by increasing the number of turns of the layered assembly 58 about the supporting core 50. Increasing the number of turns increases the radius of the filter element 12 and, therefore, also increases the length the fluid must travel to reach the supporting core 50 and exit the filter assembly 10 of the present invention. In addition to increasing the effectiveness of the filter element 12, increasing the length of the flow path 64 also lengthens the life of the fluid element 12. However, above certain path 64 lengths, higher pressures are needed to force the fluid through the filter. Path 64 of lengths in the range of 30 to 120 inches have been used. This generally creates a filter element 12 with an inner diameter of 2.1 inches and an outer diameter of 6 inches.

The tension applied to the carrier sheet 62 and to the filter media 52 as the layered assembly 58 is wound about the supporting core 50 of the filter element 12 determines the degree of compression of the filter media 52 and, therefore, the density of each convolute layer 60. The tension is preferably selected to regulate the density of the more porous coarse filter media 56 so that the coarse filter media 56 filters a major portion, preferably 80% or more, of contaminates from the fluid. Selecting such a tension allows the fine filter media 54 to filter at a lower rate with little pressure drop across its convolute layers 60, resulting in a smaller pressure drop across the entire filter element 12.

The filter element 12 of the present invention comprising convolute layers 60 also provides a lower pressure drop across the filter element 12 than would a similar filter formed of two or more concentric layers because the fluid is always able to find a path 64 of a lesser resistance, which may include a spiral circumferential path 64.

The convolute layers 60 are preferably enveloped within an open-weave elastic sock 66 as shown in FIG. 1. In constructing the filter element 12 of the present invention, preferably the elastic sock 66 is placed about the supporting core 50 and held in place at ends 68 of the supporting core 50. FIG. 1 illustrates one such construction wherein the elastic sock 66 is held in place relative to the supporting core 50 with a pair of O-rings 70. Once the layered assembly 58 is wound about the supporting core 50, the convolute layers 60 are covered and held in place by the elastic sock 66. In alternative embodiments, the convolute layers 60 are held in place by string (not shown) wound and tied around the layered assembly 58. In the most preferred embodiments of the present invention, the elastic sock 66 is doubled back upon itself at both of its ends to overlie the outer perimeter of the layered assembly 58.

Figure 12A:
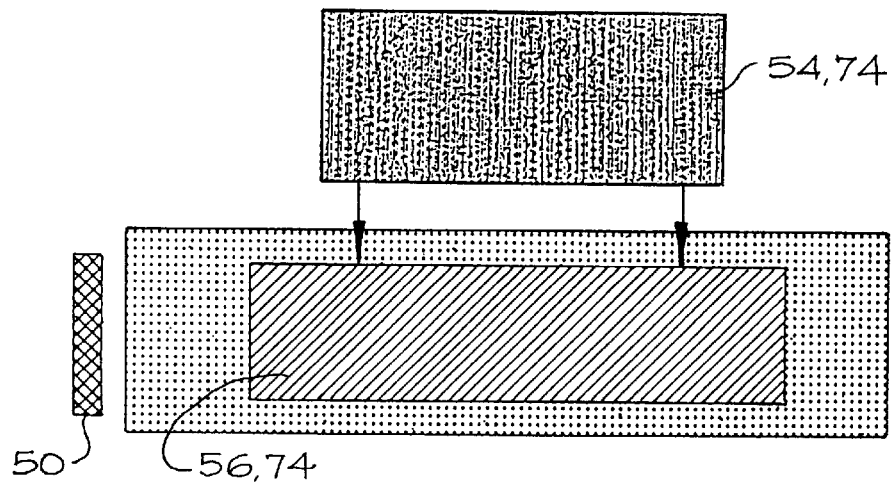
FIG. 12A shows a partially exploded view of a preferred construction of a layered assembly of the present invention wherein a blanket of coarse filter media is longer than the corresponding blanket of fine filter media and the blanket of fine filter media is wider than the corresponding blanket of coarse filter media.
Figure 12B:
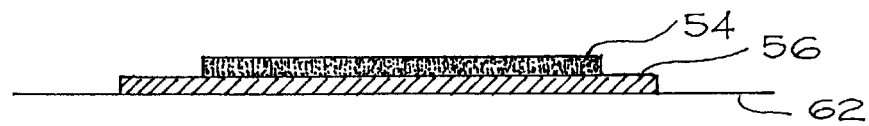
FIG. 12B shows a side view of the layered assembly of FIG. 12A.

If provisions are not taken to seal the filter element 12 at its top 44 and bottom 46 within the casing 16, unfiltered fluid might flow between the filter element 12 and the casing 16 at either the top 44 or the bottom 46 of the filter element 12 thereby bypassing the filter media 52 and circumventing the filtration system. This risk is eliminated by substantially blocking that area above and below the filter element 12 using filter media 52, preferably the fine filter media 54. Providing the fine filter media 54 at the top 44 and bottom 46 of the filter element 12 creates boundaries 84 and reduces any tendency for fluid to flow axially of the filter element 12 between successive layers 60 by maintaining a substantially similar pressure. As best shown in FIG. 1, having lateral edges 72 of the fine filter media 54 extend beyond the lateral edges 72 of the coarse filter media 56 when the layered assembly 58 is folded over by the elastic sock 66, the end-most layers 60 comprise the fine filter media 54. Using a blanket 74 of the fine filter media 54 which is slightly wider than the blanket 74 of the coarse filter media 56 accomplishes this. This preferred construction is illustrated in FIGS. 12A and 12B wherein the blanket 74 of the fine filter media 54 is shorter and wider than the corresponding blanket 74 of the coarse filter media 56. Alternatively, a separate piece of the fine filter media 54 is placed at each end of the filter element 12 to accomplish the same goal.

The present invention further comprises the central barrier 14 preferably disposed adjacent one of the layers of filter media 52. The central barrier 14 increases the effectiveness of the filter element 12 by imposing an additional section of the filter media 52 uniquely and alternately disposed to ensure that unfiltered fluid cannot circumvent all of the filter media 52 of the filter element 12, even when the convolute layers 60 of spirally wound filter media 52 of the layered assembly 58 have reached capacity.

Figure 4:
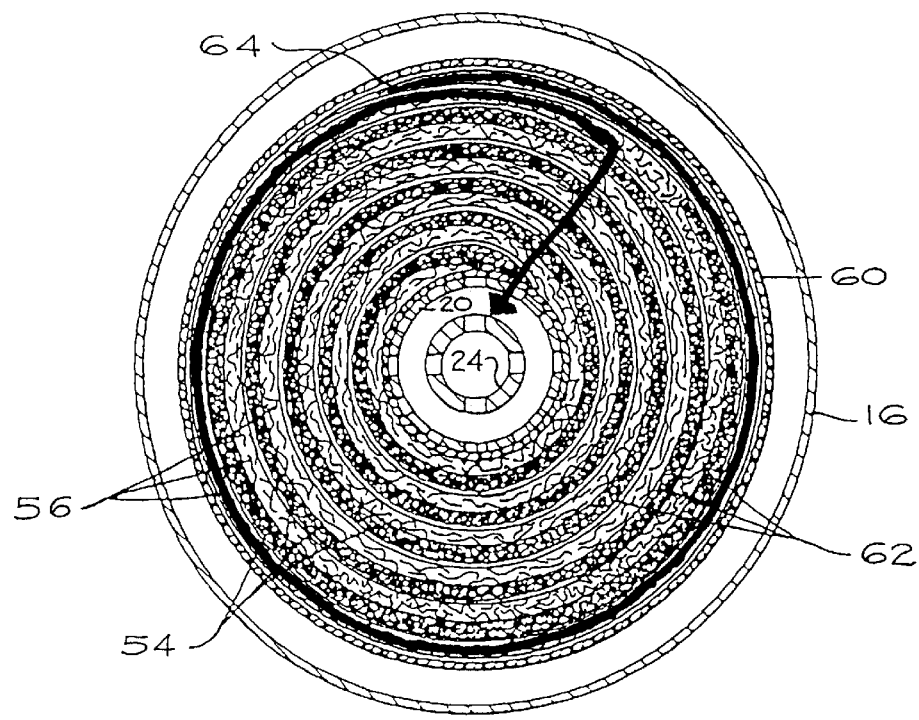
FIGS. 4 through 6 are sectional views of the filter element of FIG. 1 illustrating flow paths as the filter element of the present invention approaches capacity.
Figure 5:
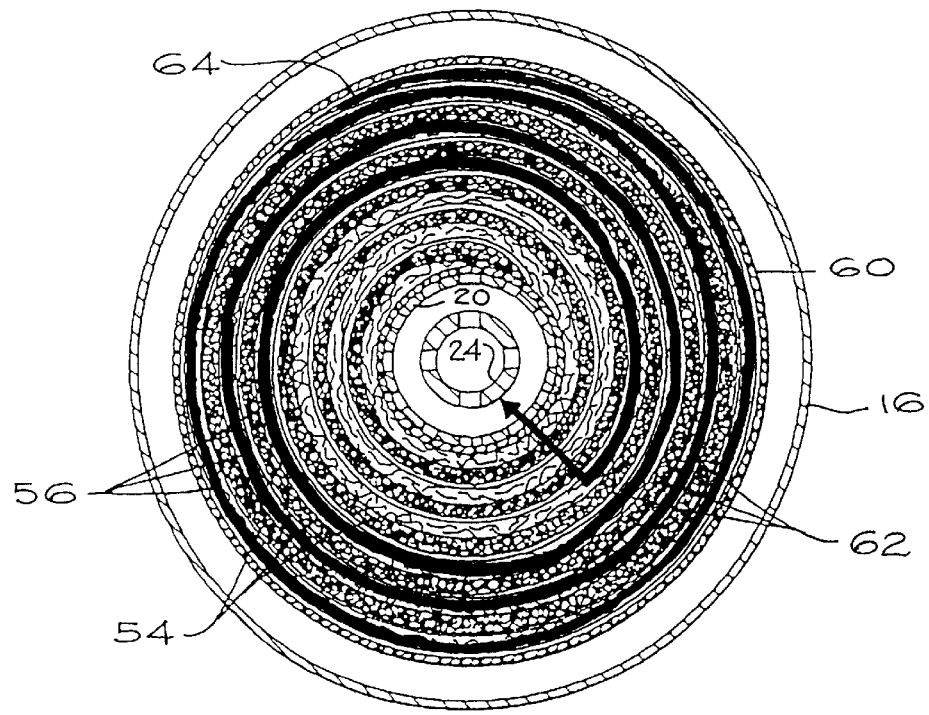
Figure 6:
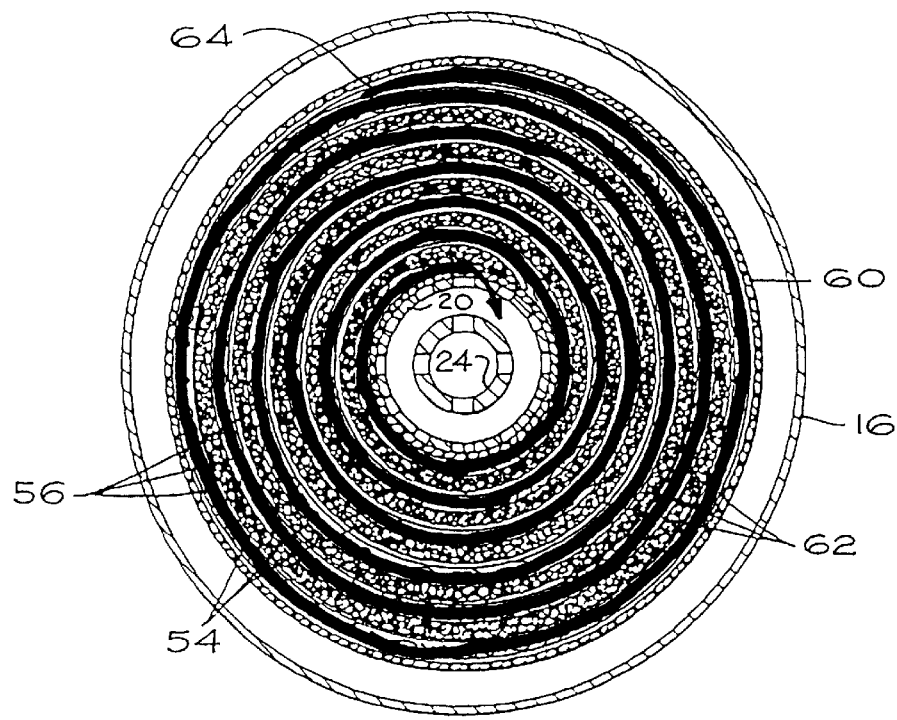

Initially, when a new filter element 12 is installed, even the outermost layers 60 of the layered assembly 58 are clean and free of contaminates, thereby allowing unfiltered fluid to travel a nearly exclusively radial path 64 inward to the supporting core 50. Eventually, however, as portions of the outermost convolute layers 60 become plugged by contaminates removed from the fluid, the unfiltered fluid is forced to flow along alternative circumferential routes before resuming substantially radial paths 64. In the absence of the central barrier 14, as the filter element 12 approaches capacity, the unfiltered fluid travels a circumferential path 64 inward toward the supporting core 50 of the filter element 12 through an increasing number of convolute layers 60. Referring, for example, to the series of illustrations in FIGS. 4 through 6, the path 64 that unfiltered fluid is forced to travel as the filter element 12 becomes increasingly plugged through use is demonstrated. The length of the circumferential path 64, represented by the solid line, increases proportionally as the filter element 12 becomes increasingly plugged. The length of the circumferential path 64 corresponds directly to the degree of use and level of contaminates removed from filtered fluid. As the outermost convolute layers 60 plug with contaminates, the unfiltered fluid is forced to travel circumferentially around and through nearly all of the convolute layers 60 of the filter element 12 as shown in FIG. 6.

In the absence of a central barrier 14, once the filter media 52 of the convolute layers 60 of the layered assembly 58 in the filter element 12 are entirely plugged, the unfiltered fluid must travel circumferentially throughout the convolute layers 60 of the entire filter element 12 and into the supporting core 50. Once in the supporting core 50, the unfiltered fluid flows downward to the outlet 22 and exits the filter assembly 10 as effluent without having been filtered at all. When this occurs, not only is the filtering assembly 10 ineffective, but the filtered fluid which has previously been collected is likely to be contaminated.

Another uncertainty inherent in the filter element 12 in the absence of the central barrier 14 as described herein, is that it was not necessarily evident when the filtering capacity of the filter element 12 was reached. Even when the filter element 12 was no longer accomplishing filtering due to the fact that the filter media 52 of the filter element 12 had reached capacity, there was no indicator that the filter element 12 needed to be changed or cleaned.

In accordance with the present invention as described herein, the central barrier 14 improves the filter element because it prevents unfiltered fluid from passing through the filter element 12 unfiltered and combining and contaminating properly filtered oil. Instead, once the filter element 12 has reached capacity, the pressure change resulting from the plugged filter media 52, and particularly from the plugged central barrier 14, slows fluid passing through the filter element 12. Typically, the user will have replaced the filter element 12 by this time due to the longer operating life provided by the invention. If the filter element 12 has not yet been replaced, the user notices the higher pressure readings from a conventional fluid pressure gauge and replaces the filter element 12 with a new filter element 12.

The central barrier 14 is preferably constructed of a material which effectively filters and traps any final particulates contained in the fluid. Materials which have been tested and found to work well as the central barrier 14 include cotton materials. For example, the fine filter media 54 of the central barrier 14 can compromise cotton batt or a blend such as 40% cotton and 60% wood excelsior. Other materials which filter and would effectively work include acrylic, polyester, paper, fiberglass and felt.

In the most preferred embodiments of the present invention, the material used to construct the central barrier 14 preferably has a nominal rating of from 5 to 20 microns, although materials with different ratings effectively filter different fluids. As those of ordinary skill in the art are aware, filter media 52 which are appropriate may include cellulose acetate, nylon, Teflon or polycarbonate. Each of these materials has different characteristics and their appropriateness depends on the application to which the filter element 12 is put. For example, glass fibers should not be use in a filter element 12 used for filtering engine lubricating oil because glass fiber can damage engines.

Figure 7:
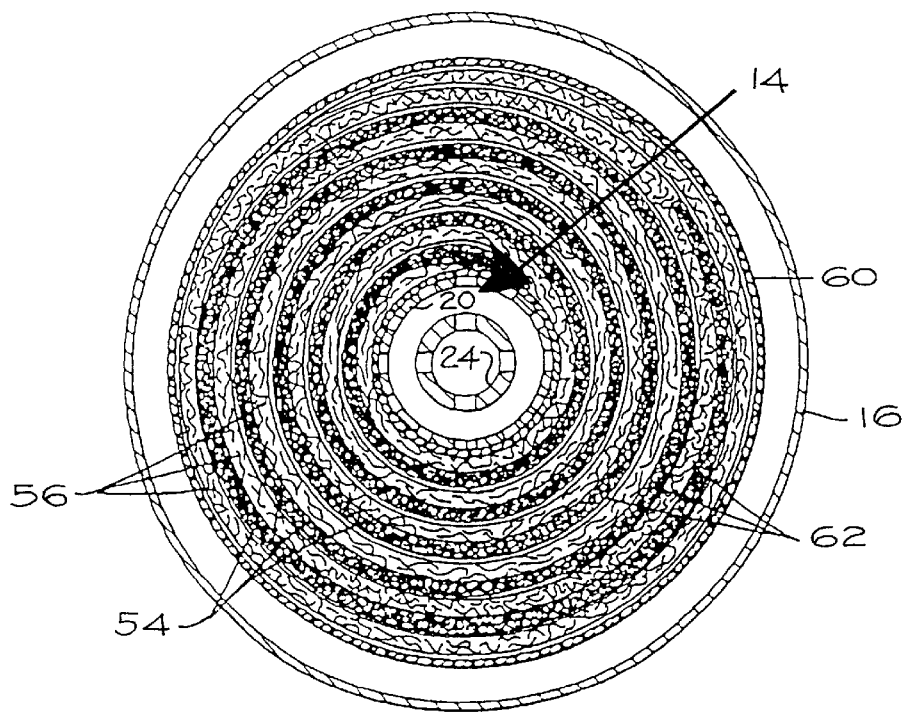
FIG. 7 is the sectional view similar to FIG. 2 further illustrating a central barrier in accordance with one preferred embodiment of the present invention.

The shape and positioning of the central barrier 14 is adjusted to maximize its productiveness. The central barrier 14 preferably fits over the end of the coarse filter media 56 nearest the supporting core 50. This preferred configuration is depicted in FIG. 7. The central barrier 14 of FIG. 7 is essentially in a V-shaped configuration and is folded over the lead edge 76 of the filter media 52 most near the central supporting core 50. A further advantage of a central barrier 14 configured as described herein is that tails 78 of the central barrier extend back of the lead edge 76 of the filter media 52 to provide additional protection against fluid circumventing the filtration system of the filter assembly 10 of the present invention.

Figure 8:
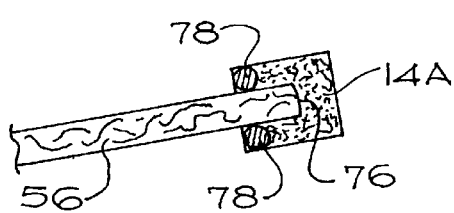
FIGS. 8 and 9 are alternative embodiments of the central barrier of FIG. 7.

An alternative embodiment of the central barrier 14 of the present invention configures the central barrier 14 as substantially a U-shape. The substantially U-shaped central barrier 14A forming the central barrier in a substantially U-shaped configuration as shown in FIG. 8 conforms with the shape of a lead edge 76 of the layered assembly 58 in a highly preferred embodiment of the present invention. This conformance seals lead edge 76 of the layered assembly 58 and the central barrier 14A to prevent fluid from passing through the filtration system unfiltered. Once the filter element 12 is nearly completely plugged with contaminants, as explained in detail above with reference to FIGS. 4 through 6, the unfiltered fluid is forced to travel a longer circumferential path 64 through the filter element 12 instead of traveling the shortest radial path 64. Further, because the filter media 52 nearest the supporting core 50 in preferred embodiments of the present invention comprises the coarse filter media 56, the fluid travels through the coarse filter media 56 to reach the perimeter of the perforate supporting core 50. The substantially U-shaped central barrier 14A slides over the end of the coarse filter media 56 and prevents fluid from escaping the central barrier 14A by flowing around the edges of the central barrier 14A.

Figure 9:
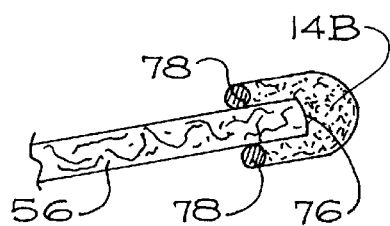

Alternatively, a substantially curved central barrier 14B as shown in FIG. 9 accomplishes the same gatekeeping function. This alternative embodiment of the present invention comprises the central barrier 14B which is slightly curved and conforms which the lead edge 76 of the layered assembly in which the corners of the lead edge 76 of the filter media 52 are slightly curved as substantially shown in FIG. 9.

The central barrier 14 of yet another alternative embodiment of the present invention (not shown) is not designed to conform with the lead edge 76 of the layered assembly 58 of the present invention, but is made from a material which is malleable enough that the material is folded around the lead edge 76 of the layered assembly 58 and remains in position after the layered assembly 58 is wound about the supporting core 50 of the filter element 12.

As those of ordinary skill in the art will recognize, the cross-sectional area of the face of the central barrier is directly correlated with the capacity of the central barrier 14, because that area can be plugged with contaminants and prevent further fluid flow.

Figure 14:
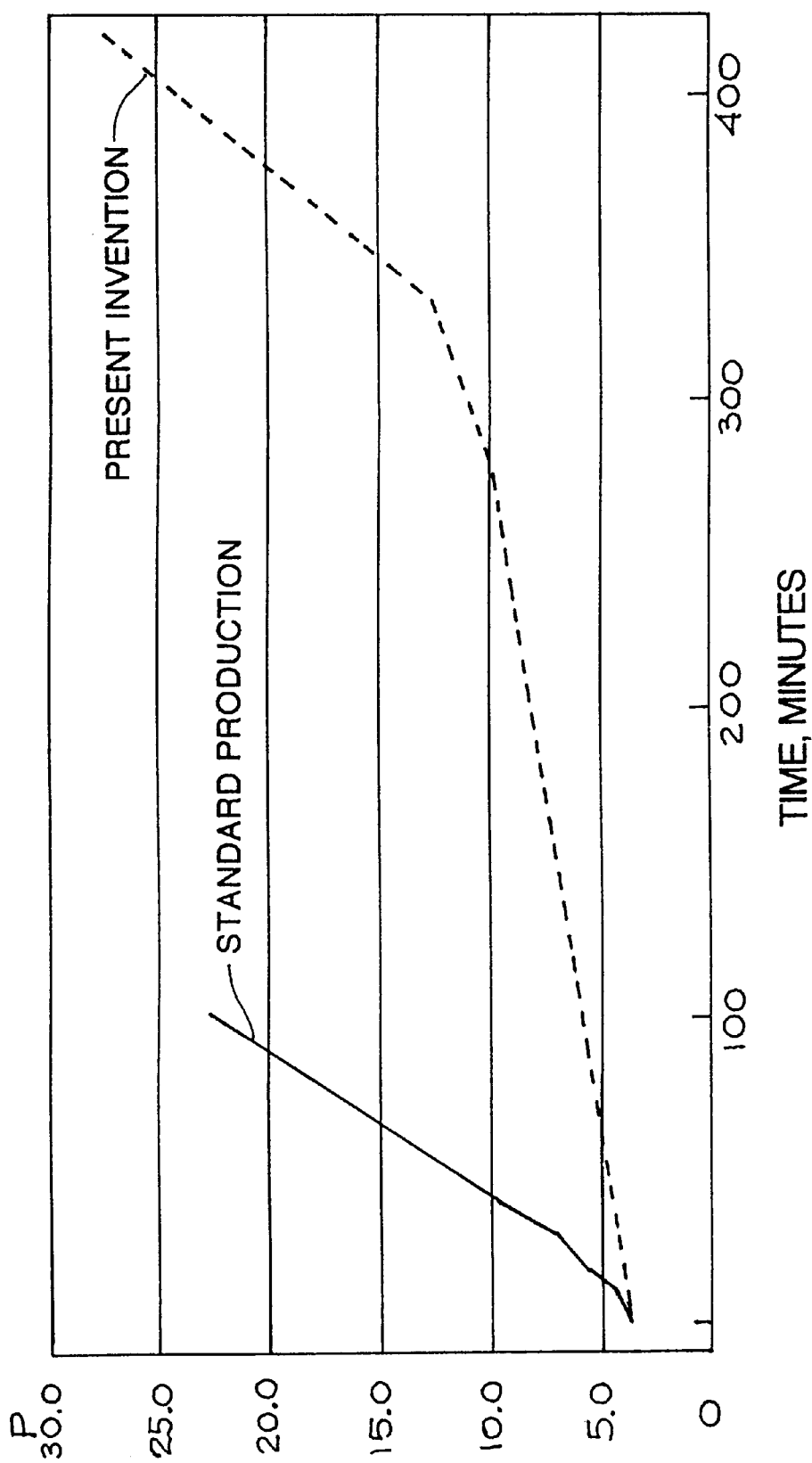
FIG. 14 is a graph demonstrating the performance of the filter assembly of the present invention with prior art filter assemblies.

Testing reveals that the filter assembly spirally wound of the present invention comprising convolute layers 60 of filter media 52 and a central barrier 14 far out performs prior art filter assemblies. Specifically, the filter element effectively filters fluids approximately four times longer than filters having concentric layers of filter media as shown in FIG. 14.

There are numerous alternative embodiments of the present invention into which various forms of the central barrier 14 can be integrated. For example, the successive convolute layers 60 of the fine and the coarse filter media 54, 56 may be formed of lengths other than simple blankets 74 like the filter media 52 described herein above. One alternative embodiment shown in FIG. 10 configures the filter media 52 in forms similar to pleated sheets 80. This filter element 12 incorporates filter media 52 which consists of a series of substantially uniform folds. In the filtering art, pleated sheets 80 are sometimes convoluted or corrugated.

Figure 3:
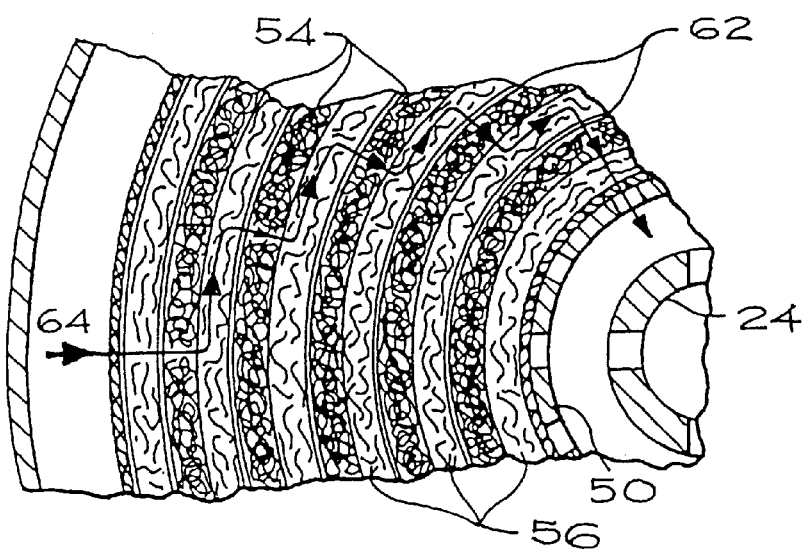
FIG. 3 is an enlarged sectional view of a portion of the filter element of FIGS. 1 and 2 illustrating a path of a fluid.
Figure 10:
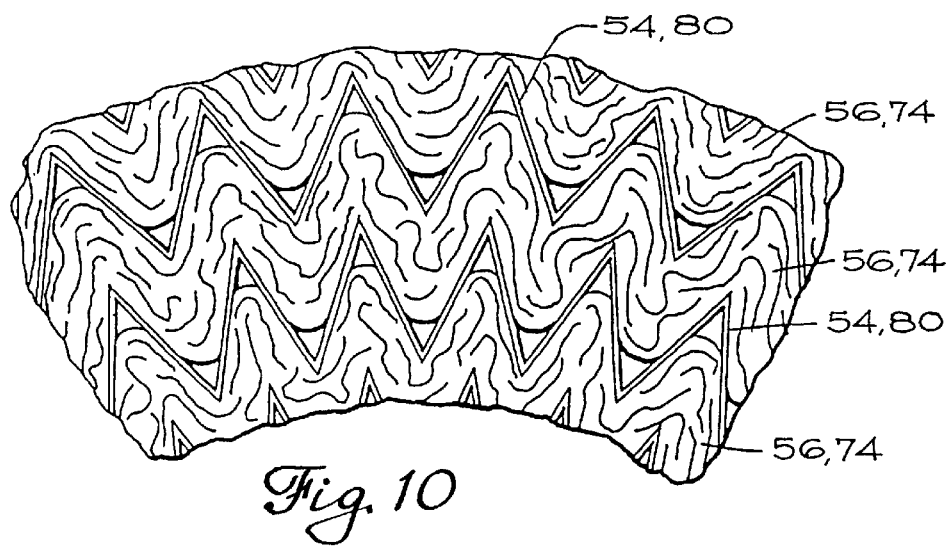
FIGS. 10 and 11 are enlarged sectional views illustrating alternative embodiments of the filter element of the present invention.

In accordance with another preferred embodiments of the invention shown in FIG. 10, the fine filter media 54 is formed into the pleated sheet 80, while the coarse filter media 56 remains configured in the form of the blanket 74. The pleated sheet 80 of fine filter media 54 and the blanket 74 of the coarse filter media 56, as in the earlier embodiments of FIGS. 1–3, are preferably superimposed against one another and spirally wound about the supporting core 50 of the filter element 12 together with the central barrier 14. As best shown in FIG. 10, the blanket 74 of the coarse filter media 56 preferably occupies the space between the successive convolute layers 60 of the fine filter media 54 formed into the pleated sheet 80 and tends to nestle into peaks and valleys defined by the pleated sheet 80 of the fine filter media 54.

Figure 11:
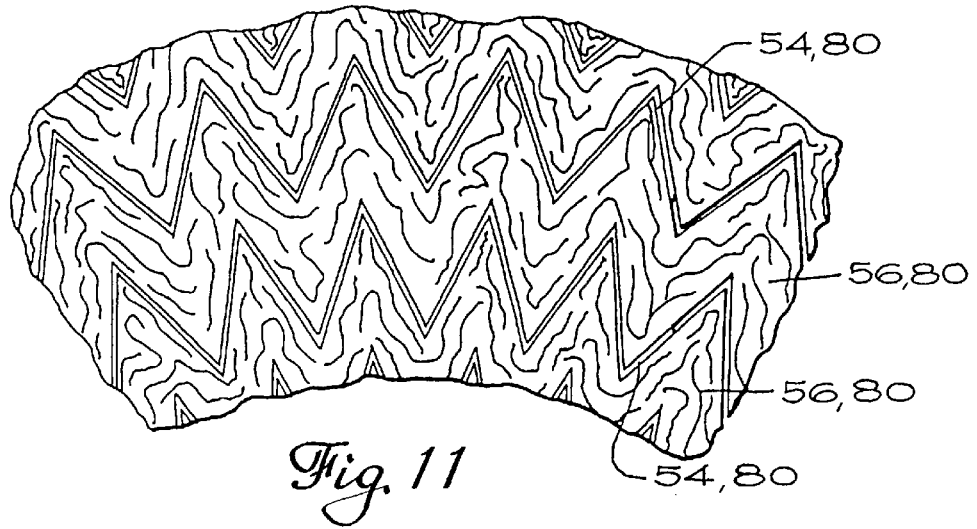

In another alternative embodiment of the present invention as depicted in FIG. 11, the alternating convolute layers 60 of fine and coarse filter media 54, 56 are provided by pleated sheets 80 of both filter media 54, 56. Forming both filter media 54, 56 into pleated sheets 80 allows the two pleated sheets 80 to rest one within another.

In the alternative embodiments of FIGS. 10 and 11, the flow paths 64 of fluid traveling through the filter element 12 of the present invention are essentially the same as the flow path 64 of the alternative embodiments wherein the filter media 52 are formed as blankets 74 in that the preferred flow path 64 remains essentially radial. However, as areas of the convolute layers 60 of the filter media 52 become plugged, the unfiltered fluid assumes increasingly circumferential paths 64 dictated by the convolute layers 60 along a spiral route until the fluid encounters an unplugged area and resumes its substantially radial filtration path 64.

Figure 13A:
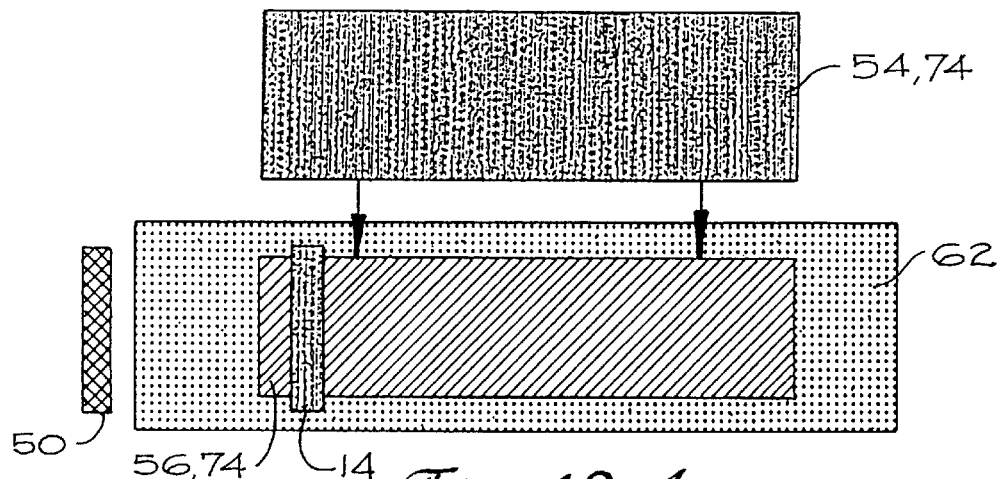
FIG. 13A illustrates a partially exploded view of yet another alternative construction of the layered assembly of the present invention where the central barrier is disposed within the blanket of coarse filter media.
Figure 13B:
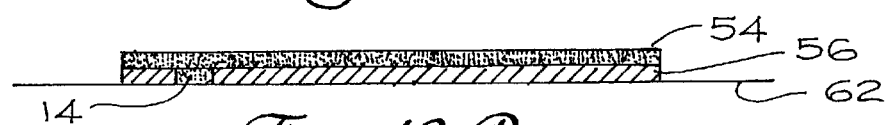
FIG. 13B is a side view of the layered assembly and central barrier of FIG. 13A.

Still another alternative embodiment of the present invention comprises the filter element 12 containing the central barrier 14 wherein the central barrier 14 is proximate to but not over the lead edge 76 of filter media 52, however, not over the lead edge 76. An illustration of such an embodiment is contained in FIGS. 13A and 13B. While the central barrier of FIGS. 13A and 13B is contained within the coarse filter media 56, an alternative construction place the central barrier 14 in the blanket 74 of fine filter media 54.

It is not essential to the operation of the filtration method and apparatus disclosed and claimed herein that the filter element 12 be a substantially cylindrical shape. Alternative embodiments of the present invention include filter elements 12 which are in the geometric forms of a cylinder, cone, disc, plate, etc.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A fluid filter element, comprising:
   a hollow perforate cylindrical supporting core;
   a relatively fine filter media of substantial cross section spirally wound about the supporting core with adjacent layers spaced from each other and with the fine filter media accommodating fluid flow for filtering in both a radial and circumferential direction through the cross section and with free access through the cross section to the supporting core;
   a relatively coarse filter media of substantial cross section disposed in the space between the layers of fine filter media and with the coarse filter media exiting at the supporting core, the coarse filter media accommodating fluid flow for filtering in both a radial and circumferential direction through the cross section and with free access through the cross section to the supporting core; and
   a central barrier comprising filter media located adjacent to the supporting core at a longitudinal lead edge of at least one of the layers of filter media, the central barrier fitted over the lead edge and having tails extending rearwardly from the lead edge.

2. The apparatus as defined in claim 1, wherein the central barrier is disposed adjacent the supporting core and a lead edge of said one layer of filter media.

3. The apparatus as defined in claim 1, wherein the central barrier is disposed adjacent the supporting core and the coarse filter media.

4. The apparatus as defined in claim 1, wherein the central barrier is substantially U-shaped.

5. The apparatus as defined in claim 1, wherein the central barrier comprises a cotton blend.

6. The apparatus as defined in claim 2, wherein the central barrier has tails surrounding the lead edge of said one layer of filter media.

7. A fluid filter element, comprising:
   a hollow perforate cylindrical supporting core;
   a relatively fine filter media of substantial cross section spirally wound about the supporting core with adjacent layers spaced from each other and with the fine filter media accommodating fluid flow for filtering in both a radial and circumferential direction through the cross section and with free access through the cross section to the supporting core;
   a relatively coarse filter media of substantial cross section disposed in the space between the layers of fine filter media and with the coarse filter media exiting at the supporting core, the coarse filter media accommodating fluid flow for filtering in both a radial and circumferential direction through the cross section and with free access through the cross section to the supporting core; and
   a central barrier comprising filter media and having a U or V shape fitted over a longitudinal lead edge of at least one of the layers of filter media adjacent to the supporting core.

8. The apparatus as defined in claim 7, wherein the central barrier is disposed adjacent a lead edge of the coarse filter media.

9. The apparatus as defined in claim 7, wherein the central barrier is substantially U-shaped.

10. The apparatus as defined in claim 7, wherein the central barrier comprises a cotton blend.

11. The apparatus as defined in claim 8, wherein the central barrier has tails surrounding the lead edge of the coarse filter media.

12. A fluid filter element, comprising:
    a hollow perforate cylindrical supporting core;
    a relatively fine filter media of substantial cross section spirally wound about the supporting core with adjacent layers spaced from each other and with the fine filter media accommodating fluid flow for filtering in both a radial and circumferential direction through the cross section and with free access through the cross section to the supporting core;
    a relatively coarse filter media of substantial cross section disposed in the space between the layers of fine filter media and with the coarse filter media exiting at the supporting core, the coarse filter media accommodating fluid flow for filtering in both a radial and circumferential direction through the cross section and with free access through the cross section to the supporting core; and
    a central barrier comprising filter media fitted over a longitudinal lead edge of at least one of the layers of filter media adjacent to the supporting core, the filter media having tails extending rearwardly from the longitudinal lead edge.

13. A method of filtering comprising the steps of:
    providing a hollow perforate cylindrical supporting core;
    providing a relatively fine filter media of substantial cross section spirally wound about the supporting core with adjacent layers spaced from each other and with the fine filter media accommodating fluid flow for filtering in both a radial and circumferential direction through the cross section and with free access through the cross section to the supporting core;
    providing a relatively coarse filter media of substantial cross section disposed in the space between the layers of fine filter media and with the coarse filter media exiting at the supporting core, the coarse filter media accommodating fluid flow for filtering in both a radial and circumferential direction through the cross section and with free access through the cross section to the supporting core; and
    fitting a central barrier comprised of filter media upon a longitudinal lead edge of at least one of the layers of filter media adjacent to the supporting core, the central barrier fitted over the longitudinal lead edge to prevent unfiltered fluid from exiting through the supporting core and having tails extending rearwardly from the longitudinal lead edge.

14. The method as defined in claim 13, wherein the central barrier is disposed adjacent the supporting core and a lead edge of said one layer of filter media.

15. The method as defined in claim 13, wherein the central barrier is disposed adjacent the supporting core and the coarse filter media.

16. The method as defined in claim 13, wherein the central barrier is substantially U-shaped.

17. The method as defined in claim 13, wherein the central barrier comprises a cotton blend.

18. The method as defined in claim 14, wherein the central barrier has tails surrounding the lead edge of said one layer of filter media.

* * * * *